(12) United States Patent
Tanimoto et al.

(10) Patent No.: US 6,414,818 B1
(45) Date of Patent: Jul. 2, 2002

(54) MAGNETIC HEAD AND MAGNETIC DISK APPARATUS USING THE SAME

(75) Inventors: Kazushi Tanimoto, Tokyo; Shigeru Hoshina, Fuchu; Hiromi Sakata; Hiroaki Yoda, both of Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/541,026

(22) Filed: Mar. 31, 2000

(30) Foreign Application Priority Data

Apr. 16, 1999 (JP) .......................................... 11-109229

(51) Int. Cl.7 .............................................. G11B 5/147
(52) U.S. Cl. ..................................................... 360/126
(58) Field of Search ................................ 360/126, 236, 360/317, 318, 320, 121, 125

(56) References Cited

U.S. PATENT DOCUMENTS 5,136,447 A * 8/1992 Makino et al. ............. 360/126
5,477,405 A * 12/1995 Okada et al. ............... 360/121
5,675,453 A * 10/1997 Matsuzawa et al. ........ 360/236
5,978,187 A * 11/1999 Shouji et al. ............... 360/126
6,055,138 A * 4/2000 Shi ............................. 360/126
6,104,576 A * 8/2000 Santini ....................... 360/126
6,130,805 A * 10/2000 Sasaki et al. ............... 360/126
6,252,748 B1 * 6/2001 Yamanaka et al. ......... 360/126

FOREIGN PATENT DOCUMENTS

JP        2-276013        11/1990

* cited by examiner

Primary Examiner—Allen Cao
(74) Attorney, Agent, or Firm—Pillsbury Winthrop LLP (57) ABSTRACT

In a magnetic head, at least its upper insulating layer is formed of a resin having a glass transition temperature of 70° C. to 100° C., a porous material, or polyimide, or the ABS is polished at a high temperature, so when the temperature increases, a deformation, which can reduce a decrease in floating height, an increase in the danger of crash, and an increase TA on the part of a magnetic disk apparatus, does not occur on the ABS side.

18 Claims, 5 Drawing Sheets

MAGNETIC HEAD AND MAGNETIC DISK APPARATUS USING THE SAME

CROSS-REFERENCE TO RELATED APPLICATION

This application is based upon and claims the benefit of priority from the prior Japanese Patent Application No. 11-109229, filed Apr. 16, 1999, the entire contents of which are incorporated herein by reference.

BACKGROUND OF THE INVENTION

The present invention relates to a magnetic head used in magnetic recording/reproduction, and a magnetic disk apparatus on which this magnetic head is mounted.

Figure 1:
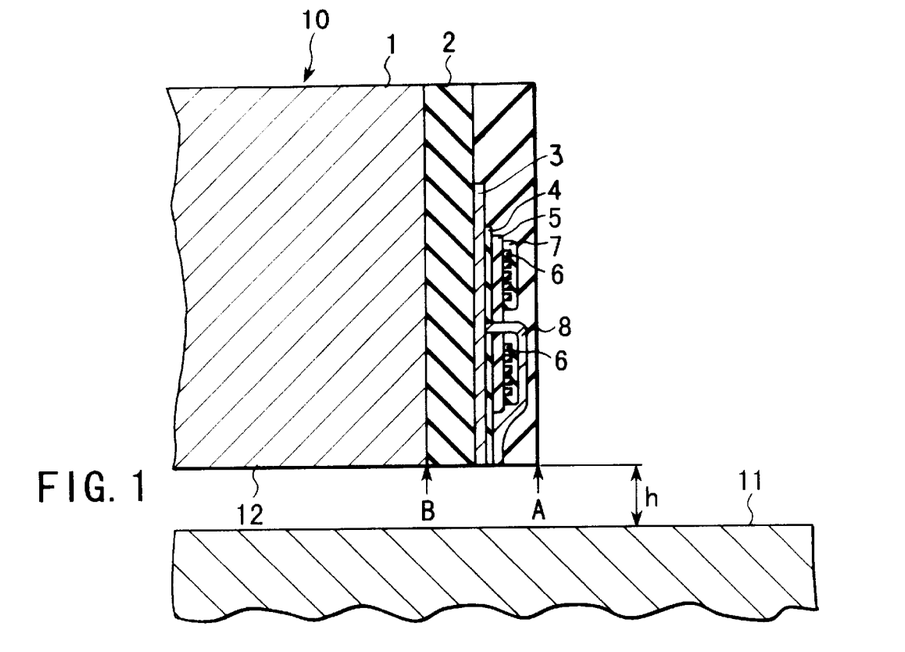
FIG. 1 is a view schematically showing recording/reproduction performed by a magnetic head.

FIG. 1 schematically shows recording/reproduction by a magnetic head.

As shown in FIG. 1, a magnetic head 10 has a substrate 1, and a lower protective layer 2, lower magnetic pole layer 3, magnetic gap layer 4, lower insulating layer 5, coil 6, upper insulating layer 7, upper magnetic pole layer 8, and upper protective layer 9, that are formed in this order on the substrate 1. The upper magnetic pole layer 8 is formed to extend from that surface of the upper insulating layer 7, which faces a disk 11, i.e., from an air bearing surface (to be referred to as ABS hereinafter) 12, to near the center of the coil 6. The upper protective layer 9 is formed on the upper insulating layer 7, upper magnetic pole layer 8, lower magnetic pole layer 3, and the like.

This magnetic head 10 has its ABS 12 facing the surface of the rotating disk 11, as shown in FIG. 1. The magnetic head 10 records/reproduces while it flies above the disk 11 through a gap having a minimum flying amount h, as shown in FIG. 1, with a dynamic pressure generated between the rotating disk 11 and ABS 12.

The insulating layers 5 and 7 are made of a resin such as a photoresist, and its thermal expansion coefficient is generally about an order of magnitude larger than that of a metal or aluminum oxide as the material of the surrounding portion. Copper which forms the coil 6 has a thermal expansion coefficient of $16.5 \times 10^{-6}$, the insulating material which covers the coil 6 has a thermal expansion coefficient of, e.g., $70 \times 10^{-6}$, and aluminum oxide which covers the resultant structure has a thermal expansion coefficient of, e.g., $5.3 \times 10^{-6}$. Hence, the thermal expansion coefficients of copper and the insulating material are larger than that of aluminum oxide. Also, the coil 6 is made of copper, and its thermal expansion coefficient is accordingly several times that of aluminum oxide which forms the lower and upper protective layers 2 and 9. Therefore, when the temperature increases, the volumes of the insulating layers 5 and 7 and coil 6 become larger than that of the surrounding aluminum oxide portion due to a difference in thermal expansion coefficient, and the magnetic head 10 deforms accordingly.

Figure 2:
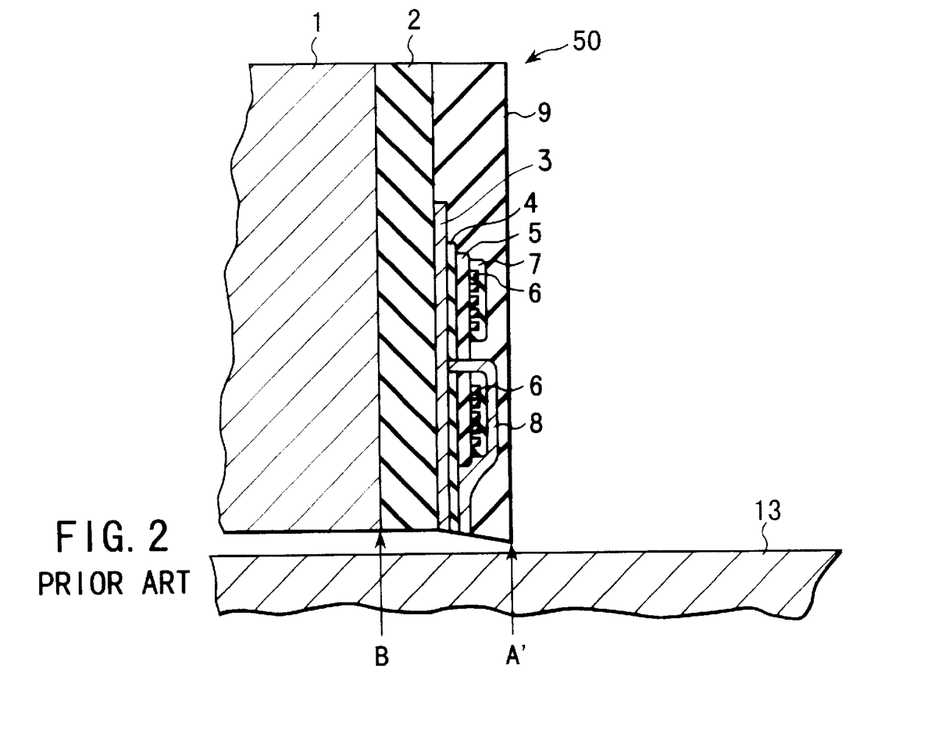
FIG. 2 is a view schematically showing deformation of the head.

FIG. 2 schematically shows deformation of the head. As shown in FIG. 2, the insulating layers 5 and 7 and coil 6 having large thermal expansion coefficients are located closer to the ABS 12 in the direction of thickness of the head, so that they deform more largely on the ABS side.

Figure 3:
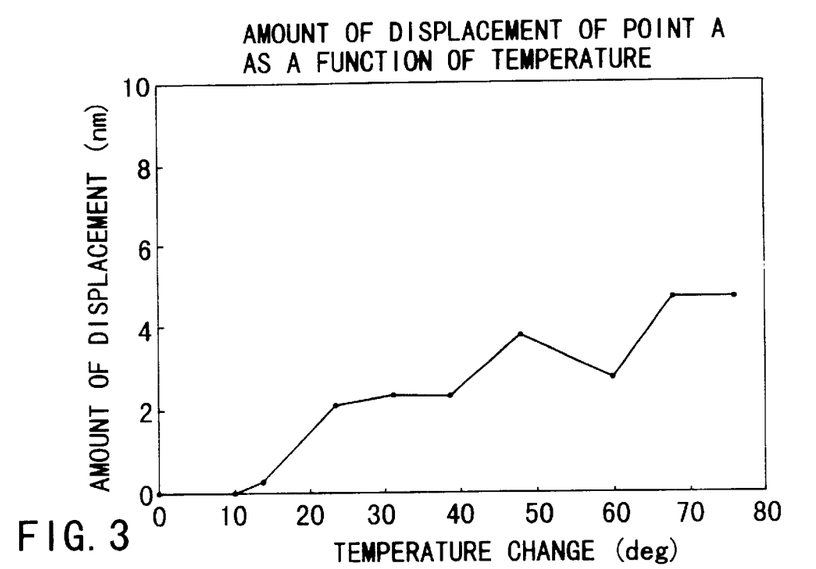
FIG. 3 is a graph showing the amount of displacement that occurs when the head deforms upon changing the ambient temperature of the head.

FIG. 3 is a graph obtained by plotting the amount of displacement that occurs when the head deforms such that the position of A changes to a position A' in FIG. 2 with respect to the position of B upon changing the ambient temperature of the head. FIG. 2 reveals that this head has a deformation of about 1 nm/10° C. at the position A.

When such a deformation occurs, the minimum flying height decreases. When the flying height decreases in the future, the danger of crash or an increase of thermal asperity (TA) may occur to decrease the reliability. Particularly, in a situation where the temperature can increase as in a vehicle, this problem is serious.

BRIEF SUMMARY OF THE INVENTION

It is the first object of the present invention to provide a magnetic head in which, when the temperature increases, a deformation, which can induce a decrease in flying height, an increase in the danger of crash, and an increase in TA on the part of a magnetic head apparatus, does not occur on the ABS side.

It is the second object of the present invention to provide a highly reliable magnetic disk apparatus in which deformation of the magnetic head on the ABS side accompanying a temperature rise is prevented so that a decrease in flying height, an increase in danger of crash, and an increase in TA do not occur.

According to the first aspect of the present invention, there is provided a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, at least the upper insulating layer, of the upper and lower insulating layers, being made of a resin having a glass transition temperature of 70° C. to 100° C.

According to the second aspect of the present invention, there is provided a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, at least the upper insulating layer, of the upper and lower insulating layers, being made of a porous material.

According to the third aspect of the present invention, there is provided a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, at least the upper insulating layer, of the upper and lower insulating layers, being made of polyimide.

According to the fourth aspect of the present invention, there is provided a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, the magnetic head having an ABS smoothed by polishing in an atmosphere of 40° C. to 90° C.

According to the fifth aspect of the present invention, there is provided a magnetic recording apparatus comprising:

a magnetic recording medium including a substrate and a magnetic recording layer formed on at least one surface of the substrate;

driving means for supporting and rotating the magnetic recording medium;

a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, at least the upper insulating layer, of the upper and lower insulating layers, being made of a resin having a glass transition temperature of 70° C. to 100° C., and the magnetic head being adapted to record information on the magnetic recording medium; and a carriage assembly supporting the magnetic recording head to be movable with respect to the magnetic recording medium.

According to the sixth aspect of the present invention, there is provided a magnetic recording apparatus comprising:

a magnetic recording medium including a substrate and a magnetic recording layer formed on at least one surface of the substrate;

driving means for supporting and rotating the magnetic recording medium;

a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, at least the upper insulating layer, of the upper and lower insulating layers, being made of a porous material, and the magnetic head being adapted to record information on the magnetic recording medium; and a carriage assembly supporting the magnetic recording head to be movable with respect to the magnetic recording medium.

According to the seventh aspect of the present invention, there is provided a magnetic recording apparatus comprising:

a magnetic recording medium including a substrate and a magnetic recording layer formed on at least one surface of the substrate;

driving means for supporting and rotating the magnetic recording medium;

a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer, at least the upper insulating layer, of the upper and lower insulating layers, being made of polyimide, and the magnetic head being adapted to record information on the magnetic recording medium; and a carriage assembly supporting the magnetic recording head to be movable with respect to the magnetic recording medium.

According to the eighth aspect of the present invention, there is provided a magnetic recording apparatus comprising:

a magnetic recording medium including a substrate and a magnetic recording layer formed on at least one surface of the substrate;

driving means for supporting and rotating the magnetic recording medium;

a magnetic head having a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer and having an ABS smoothed by polishing in an atmosphere of 40° C. to 90° C., and the magnetic head being adapted to record information on the magnetic recording medium; and a carriage assembly supporting the magnetic recording head to be movable with respect to the magnetic recording medium.

According to the present invention, a magnetic head is obtained in which, when the temperature increases, a deformation, which can induce a decrease in flying height, an increase in the danger of crash, and an increase in TA on the part of a magnetic head apparatus, does not occur on the ABS side.

According to the present invention, a highly reliable magnetic disk apparatus is obtained in which deformation of the magnetic head on the ABS accompanying a temperature rise is prevented so that a decrease in floating height, an increase in danger of crash, and an increase in TA do not occur.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present inventors have made the present invention to prevent a deformation of a magnetic head on the ABS side upon a temperature rise.

Simply stated, the present invention has the following eight aspects.

Of the eight aspects, according to the first to fourth aspects, magnetic heads are provided, and according to the fifth to eighth aspects, magnetic head apparatuses on which the magnetic heads according to the first to fourth aspects are respectively mounted are provided.

The magnetic head according to the present invention basically has a lower protective layer, a lower magnetic pole layer formed on the lower protective layer, a magnetic gap layer formed on the lower magnetic pole layer, a lower insulating layer formed on the magnetic gap layer, a coil formed on the lower insulating layer, an upper insulating layer formed on the coil, an upper magnetic pole layer formed on the upper insulating layer, and an upper protective layer formed on the upper magnetic pole layer. According to the first to third and fifth to seventh aspects, the invention is characterized in that it defines at least the upper insulating layer, of the upper and lower insulating layers. According to the fourth and eighth aspects, the invention is characterized in that it defines a head polishing method.

The present invention will be described in detail with reference to the accompanying drawings.

In the drawings, the same reference numerals denote the same components unless otherwise indicated.

According to the first aspect of the invention, at least the upper insulating layer, of the upper and lower insulating layers, is made of a resin having a glass transition temperature of 70° C. to 100° C.

Figure 4:
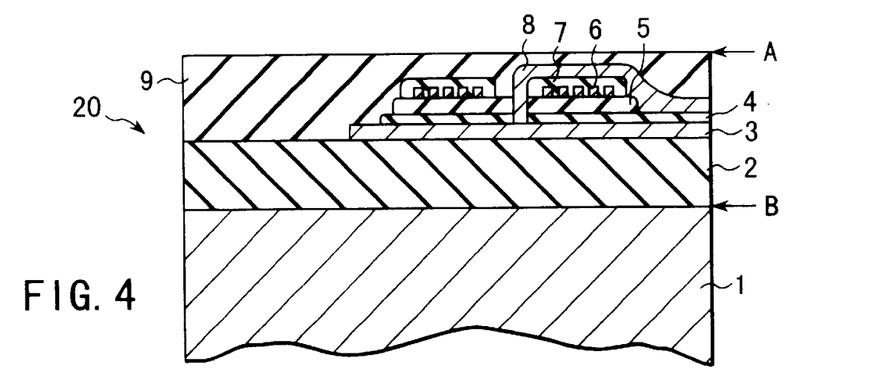
FIG. 4 is a schematic view showing an arrangement of a magnetic recording head according to the first aspect of the present invention.

FIG. 4 is a schematic view showing an arrangement of a magnetic recording head according to the first aspect of the present invention.

As shown in FIG. 4, this magnetic head 20 is comprised of a substrate 1 of, e.g., $Al_2O_3$—TiC, a lower protective layer 2 formed on the substrate 1 and made of, e.g., $Al_2O_3$, a lower magnetic pole layer 3 made of, e.g., a crystalline soft-magnetic material such as a NiFe alloy or a FeAlSi alloy, or an amorphous soft-magnetic material such as a CozrNb alloy, a magnetic gap layer 4 formed on the lower magnetic pole layer 3 and made of a nonmagnetic insulating material such as $Al_xO_y$ (e.g., $Al_2O_3$), an insulating layer 5 formed on the magnetic gap layer 4 and made of a photoresist having a glass transition temperature of, e.g., 70° C. to 100° C., a coil 6 formed on the insulating layer 5 and made of, e.g., patterned Cu, an insulating layer 7 formed on the coil 6 and having a glass transition temperature of, e.g., 70° C. to 100° C., an upper magnetic pole layer 8 formed on the insulating layer 7 to extend from the ABS side to near the center of the coil 6, and an upper protective layer 9 (made of $Al_2O_3$) formed to entirely cover the lower magnetic pole layer 3, and the insulating layers 5 and 7, upper magnetic pole layer 8, and the like formed on it.

Figure 5:
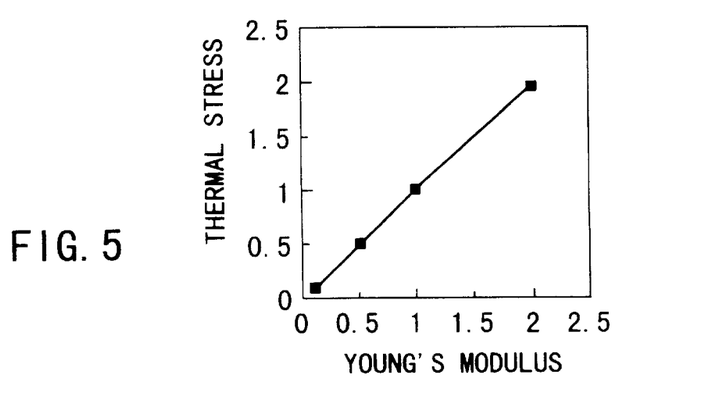
FIG. 5 is a graph showing the relationship between the thermal stress of an insulating material which occurs in a coil portion, and the Young's modulus of the coil portion.

FIG. 5 is a graph showing the relationship between the thermal stress of an insulating material which occurs in a coil portion, and the Young's modulus of the coil portion. The axis of abscissa represents the Young's modulus of the insulating material normalized taking the Young's modulus of a conventional material as 1. The axis of ordinate represents the thermal stress normalized taking the thermal stress of the conventional material as 1. FIG. 5 indicates that thermal stress that occurs in the coil portion can be reduced by decreasing the Young's modulus of the insulating material.

The Young's modulus of the insulating material can be decreased by decreasing the glass transition temperature through adjustment of the composition of the insulating material. The upper limit of the environmental temperature at which the magnetic disk apparatus can be used is 40° C. to 90° C. Thus, with the invention according to the first aspect, when the glass transition temperatures of the insulating layers 5 and 7 are decreased from the range of 100° C. to 120° C. of the conventional insulating layers by 20° C. to 30° C. to fall within the range of about 70° C. to 100° C., Young's modulus can be decreased effectively. Setting the glass transition temperature to be higher than the upper limit of the use temperature enables a great decrease in Young's modulus. This is particularly preferable as it is particularly effective to decrease thermal deformation at high temperatures. If glass transition temperature is less than 70° C., there is a tendency that sufficient stiffness of the insulating material can not be maintained.

Figure 6:
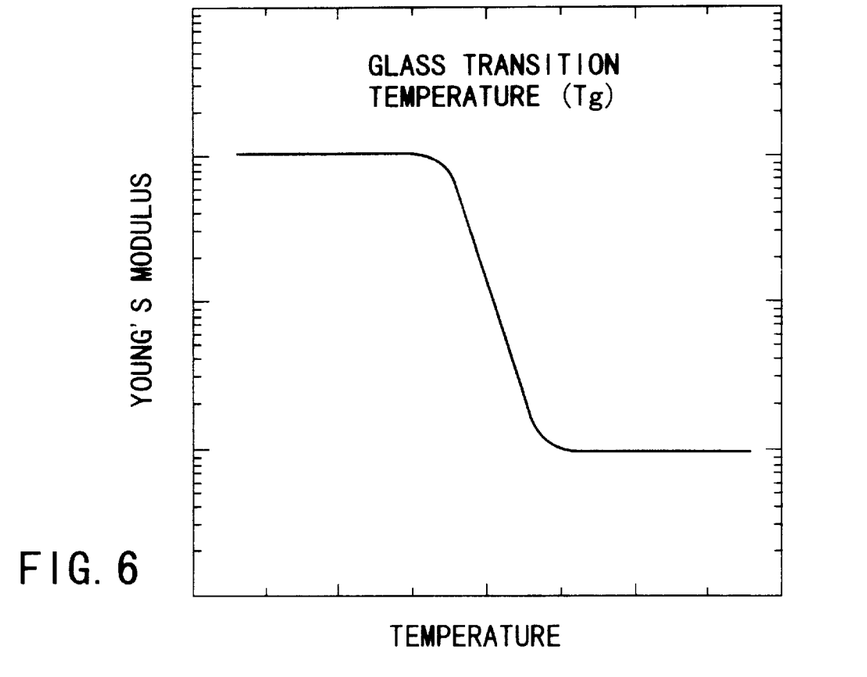
FIG. 6 is a graph showing the relationship between the Young's modulus of a resin and the temperature.

As the insulating material, a resist material is preferably used. FIG. 6 is a graph showing the relationship between the Young's modulus of the resin and the temperature. The Young's modulus of the resin is comparatively high when the temperature is low, and decreases sharply about two orders of magnitude when the temperature reaches the glass transition temperature (Tg). An example of the resist material used as the insulating material of the coil of the magnetic head includes, e.g., novolac. Novolac is a prepolymer of a phenol resin, and its glass transition temperature is 100° C. to 120° C. when it has a standard composition. Note that a resin having a low molecular weight should be employed as the resist resin. In particular, when novolac is employed, if 20% or more of a low molecular weight component having a molecular weight of 3,000 or less is formulated, the glass transition temperature of the composition can be decreased by 20° C. to 30° C. The glass transition temperature can also be decreased when a novolac resin, protected from crosslinking reaction by substituting a hydrocarbon group, e.g., a methyl group, ethyl group, and t-butyl group, for a —OH group of novolac as much as possible, is used. In this case, it is necessary to increase the concentration of a developing solution used in a process of forming the insulating layer 5 and 7 or to prolong the developing time in photolithography process.

In the invention according to the second aspect, at least the upper insulating layer, of the upper and lower insulating layers, is made of a porous material.

Figure 7:
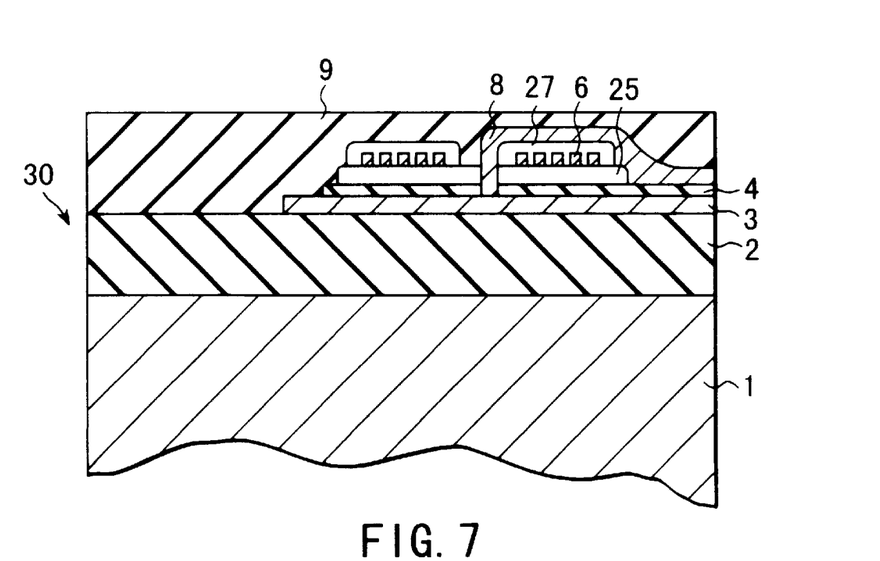
FIG. 7 is a schematic view showing an arrangement of a magnetic recording head according to the second aspect of the present invention.

FIG. 7 is a schematic view showing an arrangement of a magnetic recording head according to the second aspect of the present invention.

As shown in FIG. 7, this magnetic head 30 has the same arrangement as that of the magnetic head shown in FIG. 4, except that it has porous insulating layers 25 and 27 made of a porous material in place of the insulating layers 5 and 7.

In the invention according to the second aspect, thermal stress of the coil portion is decreased by forming the insulating layers with a porous material so as to decrease their apparent Young's modulus, thereby decrease in thermal deformation of the coil portion can be performed.

To form the insulating layers with a porous material, for example, an insulating material may be foamed, or the structure is partially carbonized by increasing the temperature. The insulating layers can be made porous by employing other methods as well.

In the invention according to the third aspect, at least the upper insulating layer, of the upper and lower insulating layers, is made of polyimide.

An example of a magnetic head according to the third aspect includes one having the same arrangement as that of the magnetic head shown in FIG. 4 except that insulating layers made of polyimide are formed in place of the insulating layers 5 and 7.

Figure 8:
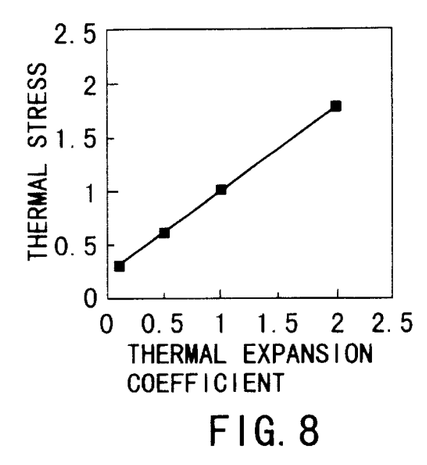
FIG. 8 is a graph showing the relationship between the thermal stress that occurs in a coil portion and the Young's modulus of an insulating material.

FIG. 8 shows a thermal stress that occurs in the coil portion upon changing the thermal expansion coefficient of the insulating material. The axis of abscissa represents the thermal expansion coefficient of the insulating material normalized taking the thermal expansion coefficient of a conventional material as 1. The axis of ordinate represents the thermal stress normalized taking the thermal stress of the conventional material as 1. FIG. 8 shows that any thermal stress that occurs in the coil portion can be reduced by decreasing the thermal expansion coefficient of the insulating material.

From the above reason, in the magnetic head according to the third aspect, polyimide is used as an insulating material having a small thermal expansion coefficient.

Polyimide used in the present invention has a thermal expansion coefficient of $-5 \times 10^{-6}$ to $20 \times 10^{-6}$.

When photosensitive polyimide is used as the insulating material, ordinary patterning can be employed to form the insulating layers. When non-photosensitive polyimide or fluorinated polyimide is used, a photosensitive resist may be employed, and polyimide or fluorinated polyimide may be etched by RIE or the like in accordance with the intended resist pattern, thereby patterning polyimide or fluorinated polyimide.

In the invention according to the fourth aspect, the ABS of the upper protective layer is smoothed by polishing in an atmosphere of 40° C. to 90° C.

To decrease the thermal stress of the coil portion as in the magnetic recording heads according to the first to third aspects, it is effective to decrease the Young's modulus of the insulating material or to use a material having a small thermal expansion coefficient. Even when these methods are employed, sometimes thermal deformation cannot be removed completely. In that case, in the polishing process of the ABS of the head chip, polishing may be performed by maintaining the temperature of the head chip at 40° C. to 90° C., preferably near the upper limit of the environmental temperature of the disk apparatus, i.e., 80° C. to 90° C., so that the head element portion is prevented from projecting at high temperatures.

Figure 9:
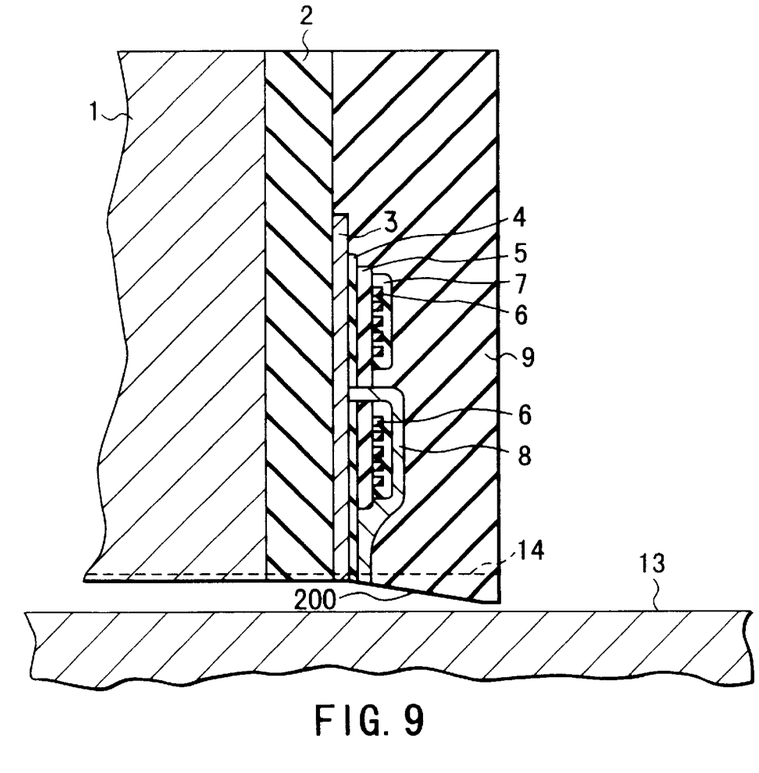
FIG. 9 is a view for explaining ABS polishing in a magnetic head according to the fourth aspect of the present invention.

FIG. 9 is a view for explaining ABS polishing in a magnetic head according to the fourth aspect.

In the magnetic head shown in FIG. 9, part of the ABS deformed at high temperatures is smoothed. In a head chip 50, smoothing of the ABS and depth adjustment of the head are performed by polishing the ABS of the head. More specifically, the temperature of the head chip is maintained near the upper limit of the environmental temperature of the disk apparatus. As shown in FIG. 9, while the head element portion projects, a substrate 1, lower protective layer 2, lower magnetic pole layer 3, magnetic gap layer 4, upper magnetic pole layer 8, and ABS side projection 200 of an upper protective layer 9, which have deformed at temperatures near the upper limit of the environmental temperature of the disk apparatus, are polished with a whetstone 13 until a surface indicated by a broken line 14 is reached. As a result, the head projection 200 is smoothed to be level with other ABS portions, thereby removing the projection. When this polishing is performed, a head, of which the head element portion does not project even at temperatures near the upper limit of the environmental temperature of the disk apparatus, can be fabricated.

In this case, at normal temperature or a temperature near the lower limit of the environmental temperature of the disk apparatus, sometimes the head element portion shrinks and recedes from the ABS. This deformation tends to increase from a temperature in the neighborhood of 40° C., as shown in, e.g., FIG. 3. When the amount of thermal deformation is large and this problem of recession is conspicuous, polishing may be performed by setting the polishing temperature to a value between the room temperature and a temperature lower than the upper limit of the environmental temperature of the disk apparatus, e.g., between about 40° C. to 80° C. Then, a head can be fabricated in which the head element portion does not greatly project at temperatures near the upper limit of the environmental temperature of the disk apparatus and the head element portion does not largely recede at low temperatures.

In order to prevent deformation of the ABS side of the head, besides the magnetic heads according to the first to fourth aspects described above, for example, the following improvements may be made.

In a magnetic head according to another application of the present invention, the ratio of the coil wire width to the width of the insulating layer between coil portions (coil wire width/width between coil portions) is 2 or less.

An example of this arrangement may include one which is similar to that of FIG. 4 except that ordinary insulating layers are formed and the ratio of the coil wire width to the width between the coil portions is 2 or less.

Figure 10:
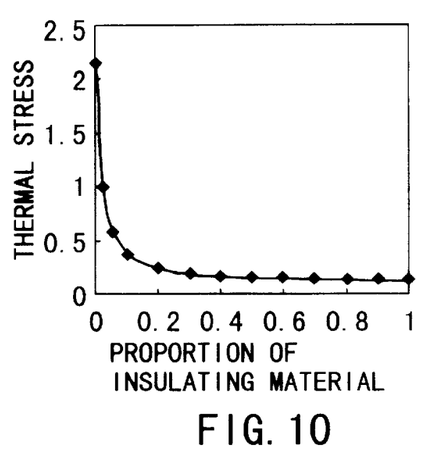
FIG. 10 is a graph showing the relationship between the thermal stress that occurs in a coil portion and the proportion of the wire width of the coil to the width of the insulating layer between coil portions.

FIG. 10 is a graph showing the relationship between the thermal stress that occurs in the coil portion and the proportion of the wire width of the coil 6 to the width of the insulating layer between coil portions. The axis of abscissa represents the proportion of the insulating material in the coil portion. FIG. 10 indicates that when the proportion of the insulating material is 0, that is, when the coil is formed of only copper, a large thermal stress occurs. As the proportion of the insulating material is increased, the thermal stress decreases sharply until the proportion becomes 0.3.

Even when the proportion of the insulating material is further increased, the thermal stress decreases only slightly. From this result, decreasing the wire width of the coil is effective in decreasing the thermal stress.

When the proportion of the insulating material is 0.3, the ratio of the coil wire width to the width of the insulating material is almost 2:1. For example, if the wire width of the copper wire of the coil is 2 $\mu$m, the thickness of the insulating layer between copper wire portions becomes 1 $\mu$m. In order to maintain the electric resistance of the coil at a constant value, the product of the coil wire width and the coil wire thickness must be maintained at a constant value. Hence, the coil wire thickness increases. However, the coil wire width can be decreased to about 1 $\mu$m. It is therefore easy to set the proportion of the insulating material in the coil width direction to 0.3 or more.

The thermal stress is relaxed by increasing the proportion of the insulating material due to the following reason. Although the insulating material has a larger thermal expansion coefficient than that of copper, its Young's modulus is about two orders of magnitude smaller than that of copper. Accordingly, when the insulating material deforms largely, it absorbs a thermal stress produced by expansion.

To decrease the amount of thermal deformation of the coil in the direction of diameter, it is effective to decrease the coil diameter. The coil diameter can be decreased to ⅓ of the thickness of the slider, or less, for example, 100 $\mu$m or less. It is particularly preferable to decrease the coil diameter to 50 $\mu$m or less.

In this manner, according to the present invention, when the thermal stress occurring in the coil at high temperatures is decreased by improving the arrangement near the coil, or when the shape of a portion that can deform is altered, deformation of the ABS at high temperatures can be prevented, so the ABS can be smoothed.

Each of magnetic disk apparatuses according to fifth to eighth aspects of the present invention has a substrate, a magnetic recording medium including a magnetic recording layer formed on at least one surface of the substrate, a driving means for supporting and rotating the magnetic recording medium, a magnetic head for recording information on the magnetic recording medium, and a carriage assembly supporting the magnetic recording head to be movable with respect to the magnetic recording medium. On these magnetic disk apparatuses, magnetic heads according to the first to fourth aspects described above are respectively mounted.

Figure 11:
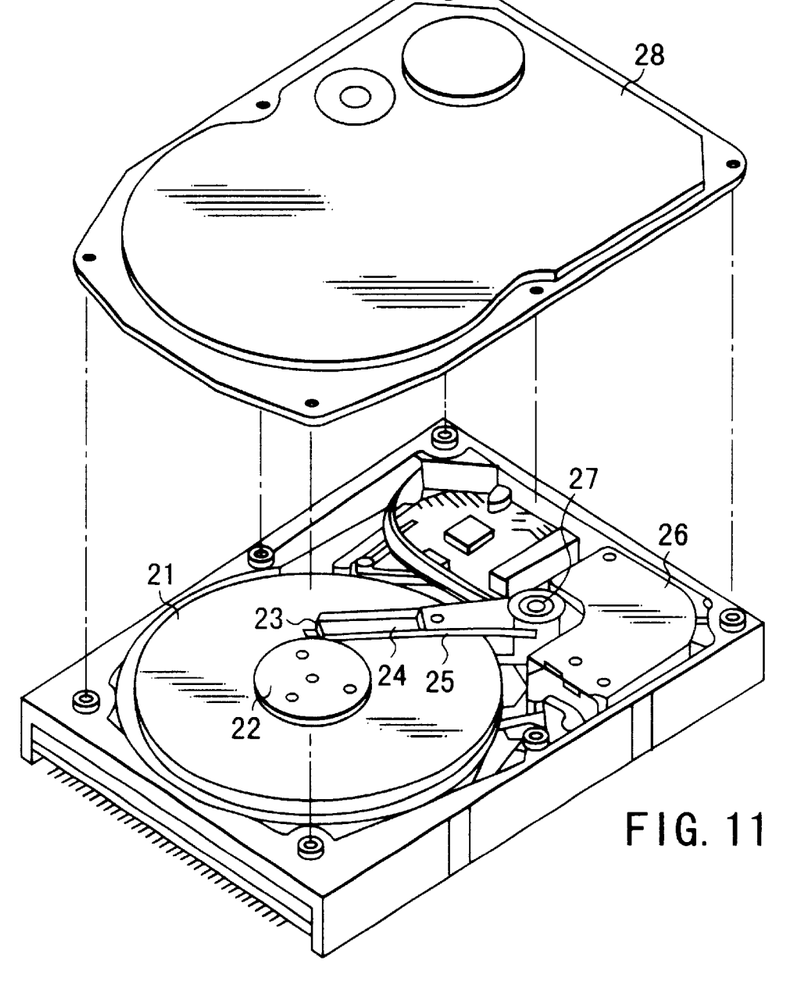
FIG. 11 is a partly exploded perspective view of a magnetic disk apparatus according to the present invention.

FIG. 11 is a partly exploded perspective view of a magnetic disk apparatus according to the present invention.

A magnetic disk 21 having a rigid arrangement for recording information is mounted on a spindle 22, and is driven by a spindle motor (not shown) to rotate at a predetermined rotational speed. A slider 23, on which any one of the magnetic heads according to the first to fourth aspects described above is mounted to access the magnetic disk 21 to record/reproduce information on/from it, is attached to the distal end of a suspension 24 comprised of a thin leaf spring. The suspension 24 is connected to one end side of an arm 25 having a bobbin or the like which holds a drive coil (not shown).

A voice coil motor 26 as one type of a linear motor is provided to the other end side of the arm 25. The voice coil motor 26 is comprised of the driving coil (not shown) and a magnetic circuit. The driving coil is wound on the bobbin of the arm 25. The magnetic circuit is comprised of a permanent magnet and a yoke facing it through the driving coil.

The arm 25 is held by ball bearings (not shown) arranged at upper and lower portions of a stationary shaft 27 and is driven to swing driven by the voice coil motor 26. More specifically, the position of the slider 23 above the magnetic disk 21 is controlled by the voice coil motor 26. In FIG. 11, reference numeral 28 denotes a lid.

Figure 12:
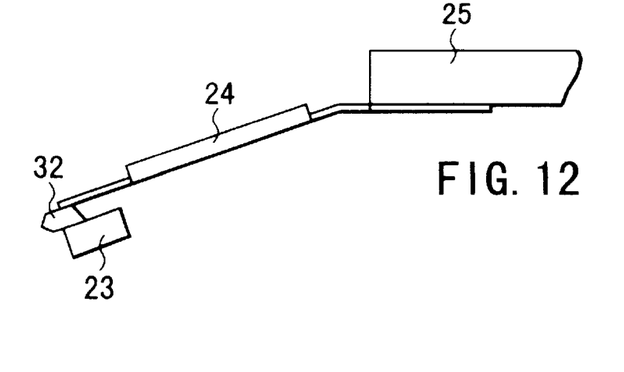
FIG. 12 is a side view of the head actuator of FIG. 11.

FIG. 12 is a side view of the head actuator of FIG. 11.

The head actuator has the suspension 24, the slider 23, and a gimbals 32. The slider 23 is fixed to the distal end of the suspension 24. The gimbals 32 connects that portion of the slider 23 which is located at the counter-magnetic disk side to the suspension 24, and serves as a load applying means for applying a necessary press force to the slider 23 toward the magnetic disk. The proximal end of the head actuator is fixed to the distal end of the arm 25 by spot welding or adhesion and extends from the arm 25.

When such a magnetic disk apparatus is used, since it uses a magnetic disk having an ABS which is smoothed even under a high temperature, highly reliable recording/reproduction can be performed without decreasing the floating height, increasing the danger of crash, or increasing the TA.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer, wherein at least said upper insulating layer, of said upper and lower insulating layers is made of a resin having a glass transition temperature of 70° C. to 100° C.

2. A magnetic head according to claim 1, wherein at least said upper insulating layer, of said upper and lower insulating layers, is made of novolac containing not less than 20% of low molecular weight component having a molecular weight of not more than 3,000.

3. A magnetic head according to claim 1, wherein at least said upper insulating layer, of said upper and lower insulating layers, is made of novolac having a —OH group substituted by at least one hydrocarbon group selected from the group consisting of a methyl group, an ethyl group, and a t-butyl group.

4. A magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer, wherein at least said upper insulating layer, of said upper and lower insulating layers is made of a porous material.

5. A magnetic head according to claim 4, wherein said porous material is one member selected from the group consisting of a material obtained by foaming an insulating material and a material obtained by carbonizing part of a structure thereof by increasing a temperature thereof.

6. A magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer, wherein at least said upper insulating layer, of said upper and lower insulating layers is made of polyimide.

7. A magnetic head according to claim 6, wherein said polyimide has a thermal expansion coefficient of $-5 \times 10^{-6}$ to $20 \times 10^{-6}$.

8. A magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer and having a smoothed air bearing surface that is smoothed by polishing in an atmosphere of 40° C. to 90° C.

9. A magnetic head according to claim 8, wherein the atmosphere has a temperature of 80° C. to 90° C.

10. A magnetic head according to claim 8, wherein at least said upper insulating layer, of said upper and lower insulating layers, is made of novolac containing not less than 20% of low molecular weight component having a molecular weight of not more than 3,000.

11. A magnetic head according to claim 8, wherein at least said upper insulating layer, of said upper and lower insulating layers, is made of novolac having a —OH group substituted by at least one hydrocarbon group selected from the group consisting of a methyl group, an ethyl group, and a t-butyl group.

12. A magnetic recording apparatus comprising:
   a magnetic recording medium including a substrate and a magnetic recording layer formed on at least one surface of said substrate;
   driving means for supporting and rotating said magnetic recording medium;
   a magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer, wherein at least said upper insulating layer, of said upper and lower insulating layers is made of a resin having a glass transition temperature of 70° C. to 100° C., and said magnetic head being adapted to record information on said magnetic recording medium; and
   a carriage assembly supporting said magnetic recording head to be movable with respect to said magnetic recording medium.

13. A magnetic recording apparatus comprising:
   a magnetic recording medium including a substrate and a magnetic recording layer formed on at least one surface of said substrate;
   driving means for supporting and rotating said magnetic recording medium;
   a magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer, at least said upper insulating layer, of said upper and lower insulating layers, being made of a porous material, and said magnetic head being adapted to record information on said magnetic recording medium; and
   a carriage assembly supporting said magnetic recording head to be movable with respect to said magnetic recording medium.

14. An apparatus according to claim 13, wherein said porous material is one member selected from the group consisting of a material obtained by expanding an insulating material and a material obtained by carbonizing part of a structure thereof by increasing a temperature thereof.

15. A magnetic recording apparatus comprising:
   a magnetic recording medium including a substrate and a magnetic recording layer formed on at least one surface of said substrate;
   driving means for supporting and rotating said magnetic recording medium;
   a magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer, at least said upper insulating layer, of said upper and lower insulating layers, being made of polyimide, and said magnetic head being adapted to record information on said magnetic recording medium; and
   a carriage assembly supporting said magnetic recording head to be movable with respect to said magnetic recording medium.

16. An apparatus according to claim 15, wherein polyimide has a thermal expansion coefficient of $-5 \times 10^{-6}$ to $20 \times 10^{-6}$.

17. A magnetic recording apparatus comprising:
   a magnetic recording medium including a substrate and a magnetic recording layer formed on at least one surface of said substrate;
   driving means for supporting said rotating said magnetic recording medium;
   a magnetic head having a lower protective layer, a lower magnetic pole layer formed on said lower protective layer, a magnetic gap layer formed on said lower magnetic pole layer, a lower insulating layer formed on said magnetic gap layer, a coil formed on said lower insulating layer, an upper insulating layer formed on said coil, an upper magnetic pole layer formed on said upper insulating layer, and an upper protective layer formed on said upper magnetic pole layer and having a smoothed air bearing surface that is smoothed by polishing in an atmosphere of 40° C. to 90° C., and said magnetic head being adapted to record information on said magnetic recording medium; and
   a carriage assembly supporting said magnetic recording head to be movable with respect to said magnetic recording medium.

18. An apparatus according to claim 17, wherein the atmosphere has a temperature of 80° C. to 90° C.

* * * * *